Jan. 14, 1941.    F. ALLENDORFF    2,228,499
APPARATUS FOR THE VIBRATION TESTING OF ARTICLES
Filed Dec. 23, 1937
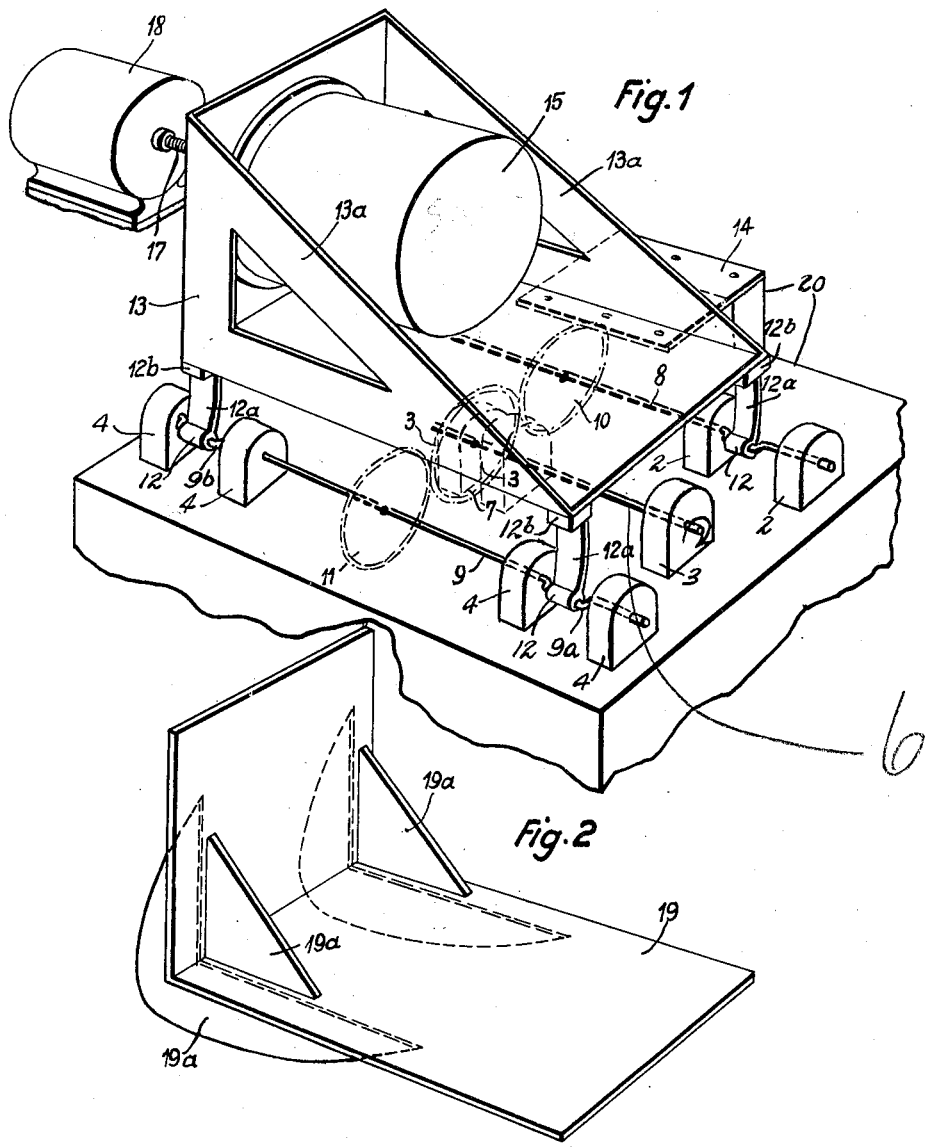
Inventor
Friedrich Allendorff
by Roy F. Steward
his attorney Patented Jan. 14, 1941

2,228,499

UNITED STATES PATENT OFFICE 2,228,499

APPARATUS FOR THE VIBRATION TESTING OF ARTICLES

Friedrich Allendorff, Stuttgart, Germany, assignor to Robert Bosch Gesellschaft mit beschränkter Haftung, Stuttgart, Germany Application December 23, 1937, Serial No. 181,416
In Germany December 30, 1936

12 Claims. (Cl. 73—51)

The present invention relates to apparatus for the vibration testing of articles such as small machines assembled ready for use, the apparatus being of that type in which a frame to which the article to be tested is fixed, is given a rapid oscillatory movement from a crank drive or the like.

In the known vibratory testing apparatus the drive does not operate positively on the frame and thus on the article to be tested which is firmly fixed thereto, but rather is communicated to the apparatus to be tested through intermediate members such as threaded springs or the like which are resilient in the direction of throw. As a result, the amplitude of vibration of the frame is so influenced by the weight of the test piece or by natural frequencies of vibration of the apparatus that it often lies well outside the desired and set amount or at the best deviates from that of the drive. The known constructions so often lack rigidity that within the apparatus itself natural frequencies of vibration of different kinds occur, such as for example, transverse vibrations or sagging of the table or frame.

It is also known to use cam drives in vibratory testing apparatus, but these afford no positive vibration of the work piece to be tested.

The object of the present invention is to avoid these difficulties and accordingly, the frame to which the test piece is fixed is connected positively and without play to the drive so as to be given an amplitude of vibration equal to that of the crank throw of the drive.

With a vibration apparatus constructed in accordance with the present invention, when the oscillating movement of the frame is a straight line, the locus of the temporary position of the frame relative to the varying angular position of the drive is substantially according to a sine curve.

The present invention is more particularly described with reference to the accompanying drawing, in which:

Figure 1 is a diagrammatic view of one form of construction by way of example.

Figure 2 is a similar diagrammatic view of a modified form of construction of frame.

In the construction according to Figure 1 the shafts 6, 8 and 9 of the driving mechanism (not shown) are mounted in bearings 3, 2 and 4, which in turn are fitted in a fixed sleeve base 20.

In the bearings 3 is mounted the shaft 6 which is driven from a driving motor of the driving mechanism, this shaft on rotation driving the shafts 8 and 9 through the pinions 7, 10 and 11.

The shafts 8 and 9 accordingly extend in directions parallel to the shaft 6. Each end of the shafts 8 and 9 is provided with a crank pin, only three of which, indicated at 8a, 9a and 9b, are illustrated, the fourth crank pin being hidden from view under the frame. These crank pins are engaged by the enlarged ends or connecting heads 12 of connecting rods which are constructed as flat legs 12a which are resilient transversely of the direction of throw and of the driving shafts. These legs 12a terminate in rectangularly shaped flanges 12b to which the frame 13 is screwed or otherwise rigidly connected.

A plate spring 14 is secured to the fixed base 20 and to the frame 13, which, in the example shown in the drawing, takes the shape of an angle bracket strengthened by struts 13a adjacent its sides.

In the drawing, a dynamo or electric current producer 15 is illustrated diagrammatically as the test piece and is secured to the vertical wall of the frame 13. The test piece 15 is rotated by a motor 18 through a clutch and a flexible shaft 17. It will be appreciated that the motor 18 is only operated when testing revoluble machines, that is to say, it lies idle when testing non-revoluble test pieces.

In operation, the shaft 6, pinion 7, toothed wheels 10 and 11, shaft 8 and shaft 9 are rotated at equal speeds and in opposite directions of rotation by the driving motor (not shown).

On rotation of these members the four crank pins are rotated with the consequential result that the connecting heads 12 are reciprocated to an extent equal to the eccentricity of the crank pins. In a convenient form of construction the eccentricity of the crank pins is 0.8 mm.

Accordingly, the frame 13 owing to its connection with the flanges 12b and the legs 12a of the connecting heads 12, is reciprocated but this reciprocation is maintained in a vertical direction only due to the connection of the frame with the spring plate 14. In other words, during its movement the frame is prevented from displacement in a horizontal direction.

The horizontal relative movement between the frame 13 and the connecting heads 12 which have both a horizontal and a vertical component of displacement, is taken up by the resilient sagging or bending of the legs 12a which are used in the present invention in place of the complicated joint mechanism which is unsuitable for the transmission of rapid oscillations in the region of 4,000 per minute to masses of any size as represented by the frame and the test piece.

The shafts 8 and 9 are so formed and are so mounted in their bearings that the bearing tolerance and any sagging or bending of the shafts themselves can be practically neglected with the result that a precise coincidence of the length of throw of the frame 13 with the degree of eccentricity of the crank gear is obtained.

In place of the crank drive which is illustrated herein for the purpose of simplicity, eccentric drives may be used in practice, particularly where the desired reciprocating stroke is extremely small.

In the construction according to Figure 2 the frame 19 for receiving the test piece is strengthened by gussets 19a both internally and externally of the angle between the vertical wall and base of the frame. In this construction an article of such dimensions as to cause it to project beyond the side edges of the frame may be tested.

I declare that what I claim is:

1. Apparatus for the vibration testing of articles such as small machines assembled ready for use, comprising a frame, means for rigidly connecting the article to be tested to said frame, a drive having a crank throw giving rapid oscillating movements, means rigidly connected to said frame for positively connecting said frame to said drive so as to positively move said frame to and fro without substantial change in length of said connection whereby said frame will be given an amplitude of vibration substantially equal to that of the crank throw of said drive, said connecting means being yieldable laterally to permit movement of said frame in a substantially straight line and to permit rotation of said drive, and guide means preventing substantial lateral displacement of said frame.

2. Apparatus as claimed in claim 1 and wherein the oscillating motion is imparted to the frame by at least three equally spaced crank gears extending in parallel directions, the motion given to the frame at any instant being equal at all parts of said frame.

3. Apparatus for the vibration testing of articles such as small machines assembled ready for use, comprising a frame, means for rigidly connecting the article to be tested to said frame, a drive having a crank throw giving rapid oscillating movements, means rigidly connected to said frame for positively connecting said frame to said drive so as to positively move said frame to and fro without substantial change in length of said connection whereby said frame will be given an amplitude of vibration substantially equal to that of the crank throw of said drive, said connecting means being yieldable laterally to permit movement of said frame in a substantially straight line and to permit rotation of said drive, and guide means for guiding said frame for movement in a substantially straight line during oscillating reciprocation of said frame.

4. Apparatus for the vibration testing of articles such as small machines assembled ready for use, comprising a frame, means for rigidly connecting the articles to be tested to said frame, a drive having a crank throw giving rapid oscillating movements, means rigidly connected to said frame for positively connecting said frame to said drive so as to positively move said frame to and fro without substantial change in length of said connection whereby said frame will be given an amplitude of vibration substantially equal to that of the crank throw of said drive, and guide means for causing said frame to move in a substantially straight line during oscillating reciprocation of said frame, such connecting means comprising leg members and interconnecting said crank drive and said frame for yielding resiliently transversely under the control of said frame by said guide means.

5. Apparatus for the vibration testing of articles such as small machines assembled ready for use, comprising a frame, means for rigidly connecting the article to be tested to said frame, a drive having a crank throw giving rapid oscillating movements, means rigidly connected to said frame for positively connecting said frame to said drive so as to positively move said frame to and fro without substantial change in length of said connection whereby said frame will be given an amplitude of vibration substantially equal to that of the crank throw of said drive, said connecting means being yieldable laterally to permit movement of said frame in a substantially straight line and to permit rotation of said drive, a rigid support for said apparatus, and a resilient plate between said support and one side of said frame for preventing substantial lateral displacement of said frame on reciprocation by said drive.

6. Apparatus for the vibration testing of articles such as small machines assembled ready for use, comprising a frame, means for rigidly connecting the articles to be tested to said frame, a drive having a crank throw giving rapid oscillating movements, means rigidly connected to said frame for positively connecting said frame to said drive so as to positively move said frame to and fro without substantial change in length of said connection whereby said frame will be given an amplitude of vibration substantially equal to that of the crank throw of said drive, said connecting means being yieldable laterally to permit movement of said frame in a substantially straight line and to permit rotation of said drive guide means guiding said frame for movement in a substantially straight line, and means for strengthening said frame so that its individual frequency of oscillation is higher than the testing frequency.

7. Apparatus for the vibration testing of articles such as small machines assembled ready for use, comprising a frame constructed as an angle member with two plates at right angles interconnected by strengthening struts formed in one piece with said plates, means for rigidly connecting the article to be tested to said frame, a drive having a crank throw giving rapid oscillating movements, and means rigidly connected to said frame for positively connecting said frame to said drive so as to positively move said frame to and fro without substantial change in length of said connection whereby said frame will be given an amplitude of vibration substantially equal to that of the crank throw of said drive, said connecting means being yieldable laterally to permit movement of said frame in a substantially straight line and to permit rotation of said drive, and guide means guiding said frame for movement in a substantially straight line.

8. Apparatus as claimed in claim 7 and wherein the strengthening struts extend beyond each side of the plates with the major portion of the struts substantially outside the angle enclosed between the plates.

9. Apparatus for the vibration testing of articles such as small machines assembled ready for use, comprising a frame, means for rigidly connecting the article to be tested to said frame, a drive having a crank throw giving rapid oscillating movements, and means positively connecting said frame to and supporting it upon said drive to positively move said frame to and fro without substantial vertical movement of said frame relative to said drive whereby said frame will be given an amplitude of vibration substantially equal to that of the crank throw of said drive, said connecting means being yieldable horizontally to permit horizontal movement of said drive relative to said frame, and guide means guiding said frame in a substantially straight line.

10. Apparatus for the vibration testing of articles such as small machines assembled ready for use, comprising a frame, means for rigidly connecting the article to be tested to said frame, a drive having a crank throw giving rapid oscillating movements, means positively connecting said frame to and supporting it upon said drive to positively move said frame to and fro without substantial vertical movement of said frame relative to said drive whereby said frame will be given an amplitude of vibration substantially equal to that of the crank throw of said drive, and guide means preventing substantial horizontal movement of said frame, said connecting means being yieldable horizontally to permit horizontal movement of said drive relative to said frame.

11. Apparatus for the vibration testing of articles such as small machines assembled ready for use, comprising a frame, means for rigidly connecting the article to be tested to said frame, a drive comprising a plurality of crank throws giving rapid oscillating movements, a plurality of legs each rigidly connected at one end to said frame, the other ends of said legs being pivotally connected to said crank throws, said legs being sufficiently rigid to support said frame on said crank throws for vertical movement by said crank throws with an amplitude of vibration substantially equal to that of said crank throws, and without substantial vertical movement of said frame relative to said crank throws, said legs being yieldable laterally to permit horizontal movement of said crank throws relative to said frame, and guide means guiding said frame in a substantially straight line.

12. Apparatus for the vibration testing of articles such as small machines assembled ready for use, comprising a frame, means for rigidly connecting the article to be tested to said frame, a drive comprising a plurality of crank throws giving rapid oscillating movements, a plurality of legs each rigidly connected at one end to said frame, the other ends of said legs being pivotally connected to said crank throws, said legs being sufficiently rigid to support said frame on said crank throws for vertical movement by said crank throws with an amplitude of vibration substantially equal to that of said crank throws, and without substantial vertical movement of said frame relative to said crank throws, said legs being yieldable laterally to permit horizontal movement of said crank throws relative to said frame, and resilient means permitting vertical movement of said frame but preventing substantial horizontal movement thereof.

FRIEDRICH ALLENDORFF.